United States Patent [19]

Sharp

[11] Patent Number: 4,683,606
[45] Date of Patent: Aug. 4, 1987

[54] WINTER WIPER BLADE

[75] Inventor: Bernard C. Sharp, White Plains, N.Y.

[73] Assignee: Parker Hannifin Corporation, Cleveland, Ohio

[21] Appl. No.: 786,397

[22] Filed: Oct. 10, 1985

[51] Int. Cl.⁴ ............................................. B60S 1/38
[52] U.S. Cl. ................................................ 15/250.42
[58] Field of Search ...................... 15/250.36–250.42

[56] References Cited

U.S. PATENT DOCUMENTS

| | | | |
|---|---|---|---|
| 2,727,271 | 12/1955 | Oishei et al. | 15/250.42 |
| 2,728,100 | 12/1955 | Oishei | 15/250.42 |
| 3,619,556 | 11/1971 | Deibel | 15/250.42 |
| 3,644,957 | 2/1972 | Diebel et al. | 15/250.42 |

Primary Examiner—Peter Feldman
Attorney, Agent, or Firm—Joseph B. Balazs

[57] ABSTRACT

A winter wiper blade consists of an articulated plastic frame, a rubber boot enclosing the frame and an external wiper blade element. The frame consists of a primary yoke and pairs of pivotable center and end yokes, each having a respective claw thereon for support of a backing strip, in turn slotted to receive the anchoring bead of the rubber wiper element. A pair of end caps, each having spring arms thereon and a further claw are adapted for interlocking engagement in a groove at the outer end of the end yoke to support the tip of the wiper element. Each end cap includes extensive surface area to engage and seal with a conforming shaped end channel portion of the rubber boot. A u-shaped saddle is disposed at the central portion of the primary yoke over the rubber boot for receipt of a wiper motor arm and is uniquely mounted by transverse rivets to facilitate assembly thereof.

6 Claims, 4 Drawing Figures

U.S. Patent  Aug. 4, 1987  4,683,606
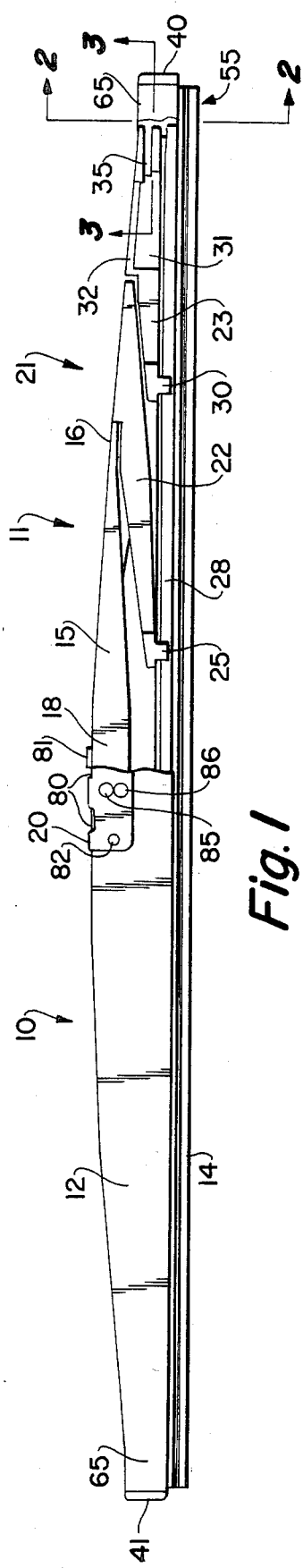
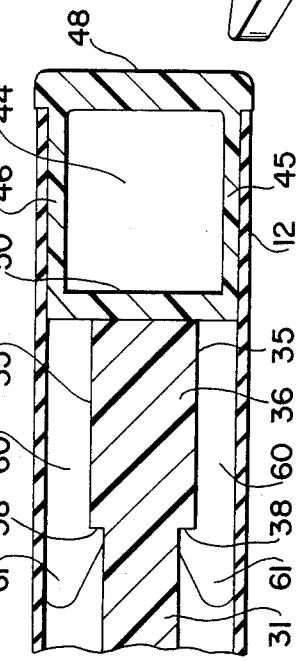
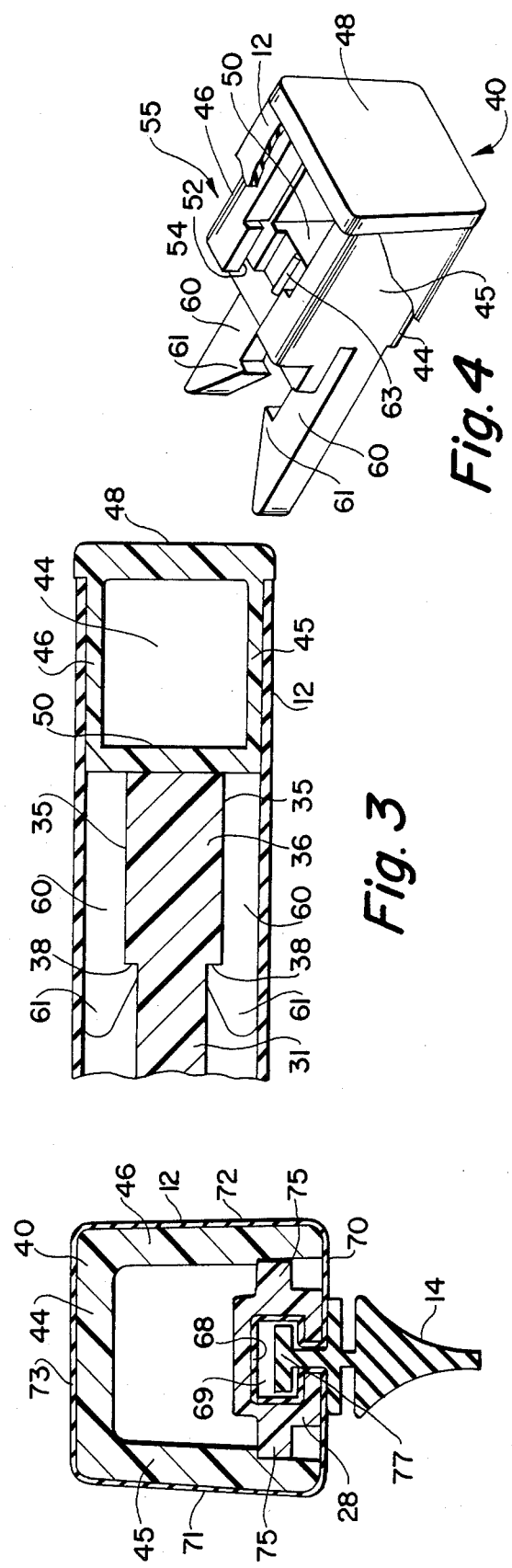
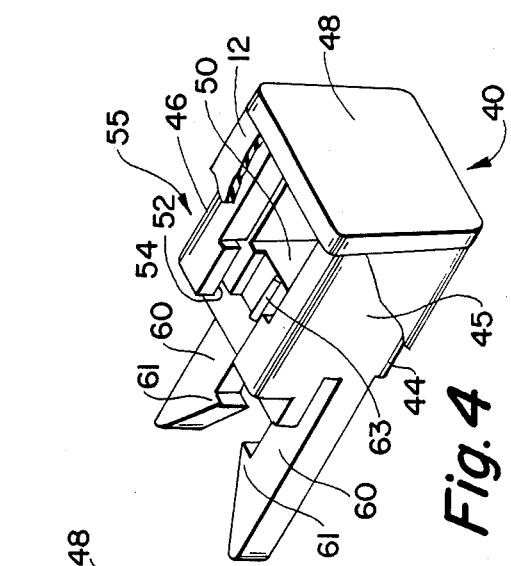

WINTER WIPER BLADE

BACKGROUND OF THE INVENTION

This invention relates to wiper blades for automotive vehicles and the like, and more particularly, to a winter wiper blade which includes a protective rubber boot or sheath thereover.

The winter wiper blade, also known as a snow blade, has received much acceptance because of the advantages not only of preventing the entrance of snow and moisture into the articulated framework structure of the blade, but also of protecting the now common plastic components of the frame from the deleterious effects of the sun and various contaminants often present in the atmosphere.

To achieve these advantages, however, it is necessary to substantially completely enclose the frame or superstructure of the blade assembly; and this is difficult to do because of the complex nature of the structure and the fact that it must be left substantially unhindered by the sheath, so as not to affect the supporting and pressure applying characteristics of the assembly.

The problem of sealing the structure is further accentuated due to the fact that the wiper blade shape is typically enlarged in the central portion thereof and narrowed toward the ends, making it difficult to place a boot thereover, and further, that the wiper blade element itself, must be retained by the superstructure and yet be external of the rubber boot.

One example of prior art structure which describes this form of construction is shown in U.S. Pat. No. 2,727,271 wherein an articulated frame is enclosed in a rubber boot. Here the end portions of the boot are closed by rubber plugs which are retained by the backing strip for the wiper element. The backing strip is received in turn in claws in the supporting yokes and is subject to some endwise movement which could affect the seal between the boot and the plug. In similar prior art devices, it has been known to adhesively seal the end junctions of the rubber boots to adjacent structure, but it is apparent that this requires additional steps in the assembly process which is disadvantageous for high volume production.

SUMMARY OF THE INVENTION

The instant invention provides a wiper blade assembly including a rubber boot therein, which is better sealed against environmental influences than prior art structures, and which is more readily assembled, making it more suitable for volume production. These advantages are achieved by providing a novel end cap and saddle support structure which does not affect the integrity of the rubber boot and enhances the seal at the outer end portions thereof. The blade is an articulated multiple yoke, multiple claw structure wherein the outermost end claw is integrally formed as a part of the end cap interlocked to the outermost yoke. One end cap is placed into assembled position after the rubber boot has been assembled. The saddle is a u-shaped channel adapted for engagement by the arm of a vehicle wiper mechanism and sits astride the central portion of the primary yoke, on the outside of the rubber boot. The saddle is retained in place by two readily applied traverse rivets which pass through the yoke, but the seal at this location is retained by a close compressive fit. Slots in the saddle allow the protrusion of the arm removing lever button, as well as the portion of the rubber boot thereover, and a symmetrical saddle configuration prevents inadvertent misassembly thereof.

BRIEF DESCRIPTION OF THE DRAWINGS

FIG. 1 is a side elevation of the wiper blade of the invention, with parts broken away;

FIG. 2 is a cross section of the end portion of the assembly of FIG. 1, taken along the lines 2—2 of FIG. 1;

FIG. 3 is a longitudinal section of the end portion of the assembly of FIG. 1, taken along the lines 3—3 of FIG. 1; and FIG. 4 is a perspective view of the end cap and part of the rubber boot of the wiper blade assembly of FIG. 1, removed therefrom and inverted for clarity.

DETAILED DESCRIPTION OF THE INVENTION

Referring to the drawings, the wiper blade 10 of the invention is shown as comprising an articulated frame 11, a highly flexible rubber boot 12 and a wiper blade element 14. Part of boot 12 is broken away to expose portions of frame 11 and both parts will be understood to be substantially symmetrical on either side of blade 10. Frame 11 comprises primary yoke 15 which is a u-shaped extended length channel structure having opposite distal ends 16 and a central portion 18. Primary yoke 15 is an injection molded plastic part and is adapted to be supported by the wiper arm of a vehicle wiper mechanism, by way of saddle 20 mounted at the central portion 18 thereof.

A secondary yoke structure 21 is pivotally supported at each distal end 16 of primary yoke 15 for articulated support of wiper element 14. In this preferred embodiment of the invention, secondary yoke 21 comprises center yoke 22 and end yoke 23, but it will be understood that variations in such configuration can be made within the teachings of this invention. Center yoke 22, also a generally u-shaped molded plastic channel piece of extended length is pivotally connected near its center to distal end 16 of primary yoke 15 for limited pivoted movement. Center yoke 22 includes center claw 25 at its inner end thereof, the latter comprising a short u-channel having a pair of transversely inwardly directed and spaced legs adapted to slidably receive and support the backing strip 28 for the wiper element 14, which construction is well understood in the art.

End yoke 23 is pivotally supported at the outer end of center yoke 22 and comprises a similar molded plastic part, the inner half being of u-shaped channel configuration terminating with outer claw 30. The outer half of end yoke 23 comprises a longitudinally extending, vertical reinforcement web 31, beneath a tapered upper wall 32, both of which are configured to terminate at their outer ends to form a pair of longitudinally extending slots 35 between vertically spaced, substantially horizontal surfaces. As best seen in the sectional view of FIG. 3, web 31 includes enlarged end portion 36 having a pair of shoulders 38 thereon at the inner end of slots 35.

Further forming a part of frame 11 are end caps 40, 41 best seen in the inverted perspective view of FIG. 4. End caps 40, 41 are identical and each comprises a molded plastic housing of generally rectangular cross sectional configuration consisting of generally flat upper wall 44, side walls 45, 46 and transverse end wall 48, the latter projecting in all dimensions beyond the upper and side walls to form stop or closure surfaces. End cap 40 includes an inner transverse wall 50 which is notched in several locations to form a pair of opposed, longitudinally extending slots 52, substantially coextensive with the inner surfaces of said walls 45, 56 and a central groove 54 intermediate slots 52. The structure forming slots 52 comprises an end claw 55 adapted for receipt of backing strip 28 of wiper element 14.

End cap 40 further comprises a pair of longitudinally extending spring arms 60, projecting outwardly of inner wall 50 as an extension of side walls 45, 46 and disposed slightly below upper wall 44. Spring arms 60 include tapered barbs 61 at the outermost end thereof and are dimensioned to be slidably received in slots 35 of end yoke 23 and to be interlocked and retained therein by the interengagement of barbs 61 with shoulders 38 of the central web 31. A longitudinally extending raised rib 63 is formed in groove 54 of inner wall 50 to assist in supporting backing strip 28 which will be positioned therein.

Rubber boot 12 is of thin rubber material, either natural or synthetic, and is molded in a configuration to substantially enclose wiper blade 10 except for wiper blade element 14 and the transverse end walls 48 of end caps 40, 41. Boot 12 thus is of generally tubular or channeled closed configuration throughout the length thereof extending from an enlarged central portion to a pair of peripherally closed end channels 65 at either end thereof. Boot 12 is specially configured to include an inward loop 68 at the lower portion thereof which is pressed into a central channel 69 in backing strip 28 to maintain a seal about the periphery of wiper blade frame 11, as is well understood in the art. Such configuration is best seen in the view of FIG. 2 wherein boot 12 is shown in cross section near the end of wiper blade 10.

At the location depicted in FIG. 2 it will be noted that boot 12 is generally in the configuration of a rectangular channel, including the configured bottom wall 70 having loop 68 therein, and comprising side walls 71, 72 and top wall 73. It will be noted, in the assembled position with end cap 40 engaged with end yoke 23 and boot 12 in place, that the walls 70–73 of boot 12 closely engage and seal the walls 44–46 of end cap 40. As noted in FIG. 1, the end channels 65 of boot 12 extend a substantial longitudinal distance thereby forming a peripherally closed tunnel which is on the order of the length of walls 44–46 of end cap 40. For a 16 or 18 inch wiper blade such end cap wall length would be on the order of one-half inch, forming an expansive surface with which to achieve a seal with the end portion 65 of boot 12. As noted in FIG. 3, boot 12 is arranged to extend into engagement with the portions of transverse end wall 48 of end cap 40 which project beyond side and top walls 44–46, to further enhance the seal at this location.

The usual assembly procedure for wiper blade assembly 10 is to join yokes 15, 22 and 23 and one end cap 41 as a preliminary assembly. Thereafter, backing strip 28, by means of the lateral projections 75 thereon, may be slid through the various claws 25, 30 and into the end claw 55 of end cap 41. Boot 12 may then be placed in position over frame 11 and end cap 40 inserted through the tunnel end 65 of the boot, being snapped into location in end yoke 23, thereby sealing against boot 12. As end cap 40 is positioned, slots 52 forming end claw 55, engage projections 75 on backing strip 28 to support the latter, while the respective transverse end walls 48 serve to limit longitudinal movement of backing strip 28.

The assembly of boot 12 is completed by pressing loop 68 thereof into the central groove or channel 69 of backing strip 28 which then is secured by placement of anchoring bead 77 of wiper element 14 in the same groove.

Saddle 20 is assembled after placement of boot 12 over frame 11 by positioning same over central section 18 of primary yoke 15 and over the portion of boot 12 at this location, without loss of the sealing integrity of boot 12. Saddle 20 is a u-shaped channel having a pair of depending side walls connected by a transverse upper wall, in a substantially rectangular configuration closely approximating the shape of the central portion 18 of primary yoke 15. Saddle 20 is symmetrical and includes a pair of openings 80 in the upper wall thereof, one of which allows the protrusion of button 81 on the wiper arm release lever which is a part of primary yoke 15. Saddle 20 is retained in place by a pair of transverse rivets 82, only one of which is seen in the broken away view of FIG. 1, but which assure a sealing engagement among the saddle 20, boot 12 and primary yoke 15 at this location. Boot 12 is specially configured as well to include a dimple at the location of release button 81 which protrudes as well through opening 80, thereby also assuring the fluid seal at this location. Saddle 20 further includes transversely aligned apertures 85 in the side walls thereof as does yoke 15 for receipt of the side pin of a conventional wiper arm. A pair of integrally molded protruding pins 86 beneath each of the apertures 85 provide a pivotal mount for an alternate bayonet type wiper arm adapter, as is well understood in the art.

I claim:

1. A winter wiper blade assembly, comprising
    a flexible, pressure applying and distributing frame,
    a rubber boot enclosing said frame, and
    a wiper blade secured in said frame for engagement with the windshield of a vehicle, said wiper blade having an anchoring bead and a wiping edge,
    said frame comprising primary and secondary yokes, said secondary yokes being pivotally supported at either end of said primary yoke and having one or more claws,
    a longitudinally extended flexible backing strip retained in said claws, said backing strip having a longitudinal groove therein receiving a portion of said rubber boot and the anchoring bead of said wiper blade,
    said rubber boot having longitudinally extending, peripherally closed channels at either end, and
    end caps at either end of said frame closely received in said channels of said boot and interlocked with said secondary yokes, each said end cap comprising an extended longitudinal surface for sealingly engaging said respective rubber boot channel, an end claw for slidably receiving and supporting said backing member, and
    a pair of longitudinally extending spring arms having barbs thereon, each said secondary yoke having a pair of longitudinal slots at the outer end thereof adapted for receipt of said spring arms.

2. The wiper blade assembly set forth in claim 1 wherein each said end cap includes an integral transverse end wall projecting outwardly of said longitudinal surface forming a stop for the outer end of said boot channel and an abutment surface for said backing strip.

3. The wiper blade assembly set forth in claim 2 wherein said end cap is rectangular in cross section and said longitudinal surfaces of said end cap are substantially flat walls, said boot channel also being generally rectangular in cross section and lying closely adjacent said walls.

4. The wiper blade assembly set forth in any one of claims 1-3 wherein each said secondary yoke comprises a center yoke pivotally attached to said primary yoke and an end yoke pivotally attached to said center yoke, each said center yoke and end yoke having a claw thereon for receipt of said backing strip.

5. The wiper blade assembly set forth in any one of claims 1-3 wherein all of said yokes and said end cap are formed of molded plastic.

6. The wiper blade assembly set forth in any one of claims 1-3 further comprising a saddle affixed to said primary yoke over said rubber boot and adapted for connection to the wiper arm of a vehicle, said saddle comprising a longitudinally extending u-shaped channel having a pair of side walls, a transverse upper wall, and a pair of slots in said upper wall, said saddle being secured to said primary yoke by a pair of transverse rivets passing through said side walls, said slots being provided to allow a wiper blade release device and a portion of said rubber boot thereover to protrude therethrough, in either mounting disposition of said saddle with respect to said primary yoke.

* * * * *